(12) United States Patent
Clinton et al.

(10) Patent No.: US 8,880,487 B1
(45) Date of Patent: Nov. 4, 2014

(54) SYSTEMS AND METHODS FOR DISTRIBUTED RULES PROCESSING

(75) Inventors: John W. Clinton, Sharon, MA (US);
Alan Trefler, Brookline, MA (US);
Benjamin Frenkel, Cambridge, MA (US)

(73) Assignee: Pegasystems Inc., Cambridge, MA (US)

(*) Notice: Subject to any disclaimer, the term of this patent is extended or adjusted under 35 U.S.C. 154(b) by 0 days.

(21) Appl. No.: 13/031,097

(22) Filed: Feb. 18, 2011

(51) Int. Cl.
*G06F 17/30* (2006.01)

(52) U.S. Cl.
USPC ............................................. 707/703

(58) Field of Classification Search
USPC ............................................. 707/703
See application file for complete search history.

(56) References Cited

U.S. PATENT DOCUMENTS

| | | | |
|---|---|---|---|
| 4,047,059 A | 9/1977 | Rosenthal |
| 4,344,142 A | 8/1982 | Diehr, II et al. |
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |

(Continued)

FOREIGN PATENT DOCUMENTS

| | | |
|---|---|---|
| DE | 19911098 A1 | 12/1999 |
| EP | 0 549 208 A2 | 6/1993 |

(Continued)

OTHER PUBLICATIONS

Anonymous "How SmartForms for Fair Blaze Advisor works", Fair Issac White Paper, http://www.fairisaac.com/, Oct. 31, 2005.

(Continued)

*Primary Examiner* — Rehana Perveen
*Assistant Examiner* — Alexander Khong
(74) *Attorney, Agent, or Firm* — Nutter McClennen & Fish LLP; David J. Powsner

(57) ABSTRACT

The invention provides in some aspects a distributed rules processing system that includes a first and second digital data processors that are coupled to one another by one or more networks. A rules base and a transactional data base are each coupled to one of the digital data processors; both may be coupled to the same digital data processor or otherwise. One or more coordination modules (e.g., "proxies"), each of which is associated with a respective one of the digital data processors, makes available to a selected one of those digital data processors from the other of those digital data processors (i) one or more selected rules from the rules base, and/or (ii) one or more data from the transactional database on which those rules are to be executed. The selected digital data processor executes one or more of the selected rules as a rules engine, executes one or more of the selected rules using a rules engine, and/or processes one or more data from the transactional database with rules executing on a rules engine.

19 Claims, 3 Drawing Sheets

(56) References Cited

U.S. PATENT DOCUMENTS

| | | |
|---|---|---|
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,678,039 A | 10/1997 | Hinks et al. |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,832,483 A | 11/1998 | Barker |
| 5,841,673 A | 11/1998 | Kobayashi et al. |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,907,490 A | 5/1999 | Oliver |
| 5,907,837 A | 5/1999 | Ferrel et al. |
| 5,910,748 A | 6/1999 | Reffay et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,105,035 A | 8/2000 | Monge et al. |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,300,947 B1 | 10/2001 | Kanevsky |
| 6,308,163 B1 | 10/2001 | Du et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,349,238 B1 | 2/2002 | Gabbita et al. |
| 6,351,734 B1 | 2/2002 | Lautzenheiser et al. |

(56) References Cited

U.S. PATENT DOCUMENTS

| | | |
|---|---|---|
| 6,359,633 B1 | 3/2002 | Balasubramaniam et al. |
| 6,369,819 B1 | 4/2002 | Pitkow et al. |
| 6,380,910 B1 | 4/2002 | Moustakas et al. |
| 6,381,738 B1 | 4/2002 | Choi et al. |
| 6,389,460 B1 | 5/2002 | Stewart et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,426,723 B1 | 7/2002 | Smith et al. |
| 6,429,870 B1 | 8/2002 | Chen et al. |
| 6,437,799 B1 | 8/2002 | Shinomi et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,463,440 B1 | 10/2002 | Hind et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,899 B1 | 3/2003 | Kraft et al. |
| 6,530,079 B1 | 3/2003 | Choi et al. |
| 6,539,374 B2 | 3/2003 | Jung |
| 6,542,912 B2 | 4/2003 | Meltzer et al. |
| 6,546,406 B1 | 4/2003 | DeRose et al. |
| 6,549,904 B1 | 4/2003 | Ortega et al. |
| 6,556,983 B1 | 4/2003 | Altschuler et al. |
| 6,556,985 B1 | 4/2003 | Karch |
| 6,560,592 B1 * | 5/2003 | Reid et al. ............... 1/1 |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |
| 6,820,082 B1 | 11/2004 | Cook et al. |
| 6,829,655 B1 | 12/2004 | Huang et al. |
| 6,831,668 B2 | 12/2004 | Cras et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,976,144 B1 | 12/2005 | Trefler et al. |
| 6,985,912 B2 | 1/2006 | Mullins et al. |
| 7,020,869 B2 | 3/2006 | Abrari et al. |
| 7,028,225 B2 | 4/2006 | Maso et al. |
| 7,031,901 B2 | 4/2006 | Abu El Ata |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,353,229 B2 | 4/2008 | Vilcauskas, Jr. et al. |
| 7,406,475 B2 | 7/2008 | Dorne et al. |
| 7,412,388 B2 | 8/2008 | Dalal et al. |
| 7,505,827 B1 | 3/2009 | Boddy et al. |
| 7,536,294 B1 | 5/2009 | Stanz et al. |
| 7,555,645 B2 | 6/2009 | Vissapragada |
| 7,574,494 B1 | 8/2009 | Mayernick et al. |
| 7,596,504 B2 | 9/2009 | Hughes et al. |
| 7,640,222 B2 | 12/2009 | Trefler |
| 7,665,063 B1 | 2/2010 | Hofmann et al. |
| 7,711,919 B2 | 5/2010 | Trefler et al. |
| 7,779,395 B1 | 8/2010 | Chotin et al. |
| 7,844,594 B1 | 11/2010 | Holt et al. |
| 7,937,690 B2 | 5/2011 | Casey |
| 7,983,895 B2 | 7/2011 | McEntee et al. |
| 8,037,329 B2 | 10/2011 | Leech et al. |
| 8,073,802 B2 | 12/2011 | Trefler |
| 8,250,525 B2 | 8/2012 | Khatutsky |

(56) References Cited

U.S. PATENT DOCUMENTS

| | | |
|---|---|---|
| 8,335,704 B2 | 12/2012 | Trefler et al. |
| 8,479,157 B2 | 7/2013 | Trefler et al. |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0073337 A1* | 6/2002 | Ioele et al. .................... 713/201 |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0184610 A1 | 12/2002 | Chong et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Schuetze et al. |
| 2003/0084401 A1 | 5/2003 | Abel et al. |
| 2003/0109951 A1 | 6/2003 | Hsiung et al. |
| 2003/0135358 A1 | 7/2003 | Lissauer et al. |
| 2003/0191626 A1 | 10/2003 | Al-Onaizan et al. |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0054610 A1 | 3/2004 | Amstutz et al. |
| 2004/0064552 A1 | 4/2004 | Chong et al. |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0145607 A1 | 7/2004 | Alderson |
| 2004/0147138 A1 | 7/2004 | Vaartstra |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0104628 A1 | 5/2005 | Tanzawa et al. |
| 2005/0125683 A1 | 6/2005 | Matsuyama et al. |
| 2005/0138162 A1 | 6/2005 | Byrnes |
| 2005/0165823 A1 | 7/2005 | Ondrusek et al. |
| 2005/0216235 A1 | 9/2005 | Butt et al. |
| 2005/0234882 A1 | 10/2005 | Bennett et al. |
| 2005/0288920 A1 | 12/2005 | Green et al. |
| 2006/0004845 A1 | 1/2006 | Kristiansen et al. |
| 2006/0020783 A1 | 1/2006 | Fisher |
| 2006/0041861 A1 | 2/2006 | Trefler et al. |
| 2006/0063138 A1 | 3/2006 | Loff et al. |
| 2006/0064486 A1 | 3/2006 | Baron et al. |
| 2006/0080082 A1 | 4/2006 | Ravindra et al. |
| 2006/0100847 A1 | 5/2006 | McEntee et al. |
| 2006/0139312 A1 | 6/2006 | Sinclair et al. |
| 2006/0149751 A1 | 7/2006 | Jade et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0218166 A1 | 9/2006 | Myers et al. |
| 2006/0271920 A1 | 11/2006 | Abouelsaadat |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0118497 A1 | 5/2007 | Katoh |
| 2007/0130130 A1* | 6/2007 | Chan et al. .................... 707/3 |
| 2007/0136068 A1 | 6/2007 | Horvitz |
| 2007/0203756 A1 | 8/2007 | Sears et al. |
| 2007/0208553 A1 | 9/2007 | Hastings et al. |
| 2007/0233902 A1 | 10/2007 | Trefler et al. |
| 2007/0239646 A1 | 10/2007 | Trefler |
| 2007/0260584 A1 | 11/2007 | Marti et al. |
| 2007/0294644 A1 | 12/2007 | Yost |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0184230 A1 | 7/2008 | Leech et al. |
| 2008/0195377 A1 | 8/2008 | Kato et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2009/0075634 A1 | 3/2009 | Sinclair et al. |
| 2009/0132232 A1 | 5/2009 | Trefler |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0276206 A1 | 11/2009 | Fitzpatrick et al. |
| 2010/0088266 A1 | 4/2010 | Trefler |
| 2010/0107137 A1 | 4/2010 | Trefler et al. |
| 2010/0217737 A1 | 8/2010 | Shama |
| 2012/0041921 A1* | 2/2012 | Canaday et al. .................. 707/607 |
| 2013/0007267 A1 | 1/2013 | Khatutsky |
| 2013/0231970 A1 | 9/2013 | Trefler et al. |
| 2014/0019400 A1 | 1/2014 | Trefler et al. |

FOREIGN PATENT DOCUMENTS

| | | |
|---|---|---|
| EP | 0669717 A1 | 8/1995 |
| EP | 996916 A1 | 5/2000 |
| EP | 1015997 A2 | 7/2000 |
| EP | 1019807 A2 | 7/2000 |
| EP | 1073955 A1 | 2/2001 |
| EP | 1073992 A1 | 2/2001 |
| EP | 1135723 A1 | 9/2001 |
| EP | 1163604 A2 | 12/2001 |
| EP | 1183636 A1 | 3/2002 |
| EP | 1196882 A1 | 4/2002 |
| EP | 1203310 A1 | 5/2002 |
| EP | 1208482 A1 | 5/2002 |
| EP | 1212668 A2 | 6/2002 |

(56) References Cited

FOREIGN PATENT DOCUMENTS

| | | |
|---|---|---|
| EP | 1240592 A1 | 9/2002 |
| EP | 1277102 A2 | 1/2003 |
| EP | 1277119 A1 | 1/2003 |
| EP | 1277120 A1 | 1/2003 |
| EP | 1277153 A1 | 1/2003 |
| EP | 1277155 A1 | 1/2003 |
| EP | 1277329 A1 | 1/2003 |
| EP | 1374083 A1 | 1/2004 |
| EP | 1382030 A2 | 1/2004 |
| EP | 1386241 A1 | 2/2004 |
| EP | 1393172 A2 | 3/2004 |
| EP | 1393188 A1 | 3/2004 |
| EP | 1402336 A2 | 3/2004 |
| EP | 1407384 A1 | 4/2004 |
| EP | 1 430 396 A1 | 6/2004 |
| EP | 1438649 A1 | 7/2004 |
| EP | 1438654 A1 | 7/2004 |
| EP | 1438672 A1 | 7/2004 |
| EP | 1483685 A1 | 12/2004 |
| EP | 1490747 A1 | 12/2004 |
| EP | 1490809 A1 | 12/2004 |
| EP | 1492232 A1 | 12/2004 |
| EP | 1782183 A2 | 5/2007 |
| EP | 1830312 | 9/2007 |
| EP | 1840803 | 10/2007 |
| EP | 2115581 A1 | 11/2009 |
| WO | WO-9838564 A2 | 9/1998 |
| WO | WO-9840807 A2 | 9/1998 |
| WO | WO-9905632 A1 | 2/1999 |
| WO | WO-9945465 A1 | 9/1999 |
| WO | WO-9950784 A1 | 10/1999 |
| WO | WO-0033187 A1 | 6/2000 |
| WO | WO-0033217 A1 | 6/2000 |
| WO | WO-0033226 A1 | 6/2000 |
| WO | WO-0033235 A1 | 6/2000 |
| WO | WO-0033238 A2 | 6/2000 |
| WO | WO-0052553 A2 | 9/2000 |
| WO | WO-0052603 A1 | 9/2000 |
| WO | WO-0140958 A1 | 6/2001 |
| WO | WO-0175610 A1 | 10/2001 |
| WO | WO-0175614 A1 | 10/2001 |
| WO | WO-0175747 A1 | 10/2001 |
| WO | WO-0175748 A1 | 10/2001 |
| WO | WO-0176206 A1 | 10/2001 |
| WO | WO-0177787 A2 | 10/2001 |
| WO | WO-0179994 A2 | 10/2001 |
| WO | WO-0221254 A2 | 3/2002 |
| WO | WO-0244947 A2 | 6/2002 |
| WO | 02/056249 A2 | 7/2002 |
| WO | WO-02080006 A1 | 10/2002 |
| WO | WO-02080015 A1 | 10/2002 |
| WO | WO-02082300 A1 | 10/2002 |
| WO | WO-02084925 A2 | 10/2002 |
| WO | WO-02088869 A2 | 11/2002 |
| WO | WO-02091346 A1 | 11/2002 |
| WO | WO-02101517 A2 | 12/2002 |
| WO | WO-02103576 A1 | 12/2002 |
| WO | WO-03021393 A2 | 3/2003 |
| WO | WO-03029923 A2 | 4/2003 |
| WO | WO-03029955 A1 | 4/2003 |
| WO | WO-03030005 A1 | 4/2003 |
| WO | WO-03030013 | 4/2003 |
| WO | WO-03030014 | 4/2003 |
| WO | WO-03058504 | 7/2003 |
| WO | WO-03069500 | 8/2003 |
| WO | WO-03071380 | 8/2003 |
| WO | WO-03071388 | 8/2003 |
| WO | WO-03073319 | 9/2003 |
| WO | WO-03077139 | 9/2003 |
| WO | WO-03085503 | 10/2003 |
| WO | WO-03085580 | 10/2003 |
| WO | WO-04001613 | 12/2003 |
| WO | WO-2004003684 | 1/2004 |
| WO | WO-2004003766 | 1/2004 |
| WO | WO-2004003885 | 1/2004 |
| WO | WO-2004046882 | 6/2004 |
| WO | WO-2004061815 | 7/2004 |
| WO | WO-2004086197 | 10/2004 |
| WO | WO-2004086198 | 10/2004 |
| WO | WO-2004095207 | 11/2004 |
| WO | WO-2004095208 | 11/2004 |
| WO | WO-2004114147 | 12/2004 |
| WO | WO-2005001627 A2 | 1/2005 |
| WO | WO-2005003888 | 1/2005 |
| WO | WO-2005010645 A2 | 2/2005 |
| WO | WO-2005/117549 | 12/2005 |
| WO | WO-2006081536 A2 | 8/2006 |
| WO | 2007/033922 A2 | 3/2007 |
| WO | WO-2008109441 A1 | 9/2008 |
| WO | WO-2009097384 A1 | 8/2009 |

OTHER PUBLICATIONS

Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.

Busse, Ralph et al., "Declarative and Procedural Object Oriented Views", 1998, IEEE retrieved Mar. 22, 2007.

Buyya, Rajkumar et al., "Economic Models for Resource Management and Scheduling in Grid Computing," 2002. Concurrency and Computation: Practice and Experience. vol. 14. pp. 1507-1542.

B. Thuraisingham, "From Rules to Frames and Frames to Rules," AI Expert, pp. 31-39, Oct. 1989.

Cheng, Cheng-Chung; Smith, Stephen F.; "A Constraint Satisfaction Approach to Makespan Scheduling," AIPS 1996 Proceedings, pp. 45-52 (1996).

Cheng and Smith, "Applying Constraint Satisfaction Techniques to Job Shop Scheduling," 1997. Annals of Operations Research. 70: 327-357 (1997).

Cochrane, Roberta et al., "Integrating Triggers and Declarative Constraints in SQL", p. 567-578, Proceedings of the 22nd VLDB Conference Mumbai (Bombay), India, 1996, retrieved Mar. 22, 2007.

D. Burleson, "Adding behaviors to relational databases," DBMS, 8(10): 68(5) (1995).

E. Bertino and P. Foscoli, "Index Organizations for Object-Oriented Database Systems," IEEE Trans. on Knowledge and Data Engineering, 7(2):193-209 (1995).

F. Maryanski, et al., "The Data Model Compiler: A Tool for Generating Object-Oriented Database Systems," 1986 Int'l. Workshop on Object-Oriented Database Systems, 73-84 (1986).

Francisco, S. et al. "Rule-Based Web Page Generation" Proceedings of the 2nd Workshop on Adaptive Hypertext and Hypermedia, Hypertext'98, Jun. 20-24, 1998.

FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.

H.A. Kuno and E.A. Rundensteiner, "Augmented Inherited Multi-Index Structure for Maintenance of Materialized Path Query Views," Proc. Sixth Int'l. Workshop on Research Issues in Data Engineering, pp. 128-137, Feb. 1996.

Jones, S. et al., "A User-Centered Approach to Functions in Excel," International Conference on Functional Programming, Uppsala, Jun. 30, 2003, pp. 1-12.

Kuhn, H.W. "The Hungarian Method for the Assignment Problem," Naval Research Logistics Quarterly, 2 (1955), pp. 83-97.

L.G. DeMichiel, et al., "Polyglot: Extensions to Relational Databases for Sharable Types and Functions in a Multi-Language Environment," Proc. Ninth Int'l. Conf. on Data Engineering, pp. 651-660, Apr. 1993.

Lippert, Eric, "Fabulous Adventures in Coding: Metaprogramming, Toast and the Future of Development Tools," Microsoft.com Blog, MSDN Home, published Mar. 4, 2004, 6 pgs.

Manghi, Paolo et. al. "Hybrid Applications Over XML: Integrating the Procedural and Declarative Approaches", 2002 ACM, pp. 1-6. Retrieved Mar. 22, 2007.

McConnell, Steven C., "Brooks' Law Repealed," IEEE Software, pp. 6-9, Nov./Dec. 1999.

(56) References Cited

OTHER PUBLICATIONS

Mecca, G. et al. "Cut and Paste", ACM, pp. 1-25 and Appendix I-IV (1999). Retrieved Mar. 22, 2007.

M. Riccuiti, "Oracle 8.0 on the way with objects: upgrade will also build in multidimensional engine," InfoWorld, V. 17(39), p. 16(1), Sep. 1995.

M. Stonebraker, "The Integration of Rule Systems and Database Systems," IEEE Trans. on Knowledge and Data Engineering, vol. 4(5), pp. 415-423, Oct. 1992.

P. Morizet-Mahoudeaux, "A Hierarchy of Network-Based Knowledge Systems," IEEE Trans. on Systems, Man, and Cybernetics, vol. 21(5), pp. 1184-1191, Sep. 1991.

Reinersten, Don, "Is It Always a Bad Idea to Add Resources to a Late Project?," Oct. 30, 2000. Electronic Design. vol. 48, Issue 22, p. 70.

Schiefelbein, Mark A Backbase Ajax Front-end for J2EE Applications, Internet Article, http://dev2dev.bea.com/1pt/a/433>, Aug. 29, 2005.

S. Danforth, "Integrating Object and Relational Technologies," Proc. Sixteenth Annual Int'l Computer Software and Applications Conf., pp. 225-226, Sep. 1992 (abstract).

S. Salvini and M.H. Williams, "Knowledge Management for Expert Systems," IEE Colloquium on 'Knowledge Engineering', 3 pages, May 1990.

Smedley, T.J. et al., "Expanding the Utility of Spreadsheets Through the Integration of Visual Programming and User Interface Objects," School of Computer Science, Technical University of Nova Scotia, ACM, 1996; pp. 148-155.

T. Chan and W. Hwang, "Towards Integrating Logic, Object, Frame, and Production," Proc. Fourth Int'l Conf. on Software Engineering and Knowledge Engineering, pp. 463-469, Jun. 1992.

T. Sellis, et al., "Coupling Production Systems and Database Systems: A Homogeneous Approach," IEEE Trans. on Knowledge and Data Engineering, vol. 5(2), pp. 240-256, Apr. 1993.

V.M. Markowitz and A. Shoshani, "Object Queries over Relational Databases: Language, Implementation, and Applications," IEEE Xplore, pp. 71-80, Apr. 1993.

Vranes, S. "Integrating Multiple Paradigms within the Blackboard Framework," IEEE Transactions on Software Engineering, vol. 21, No. 3, Mar. 1995, pp. 244-262.

W. Kim, "Object-Oriented Databases: Definition and Research Directions," IEEE Trans. on Knowledge and Data Engineering, vol. 2(3) pp. 327-341, Sep. 1990.

W. Sun, et al., "Supporting Inheritance in Relational Database Systems," IEEE, pp. 511-518, Jun. 1992.

Y.-M. Shyy and S.Y.W. Su, "Refinement Preservation for Rule Selection in Active Object-Oriented Database Systems," Proc. Fourth Int'l Workshop on Research Issues in Data Engineering, pp. 115-123, Feb. 1994.

Yang, Bibo; Geunes, Joseph; O'Brien, William J.; "Resource-Constrained Project Scheduling: Past Work and New Directions," Apr. 2001.

Communication for European Patent Application No. 07250844.3 enclosing European Search Report, dated Jul. 11, 2007.

International Search Report & Written Opinion for PCT/US09/32341, mailed Mar. 11, 2009.

International Search Report & Written Opinion for PCT/US06/03160, mailed Jul. 21, 2008.

International Search Report for PCT/US08/55503, mailed Jul. 28, 2008.

International Search Report for PCT/US05/018599, dated May 15, 2007.

International Preliminary Report on Patentability for PCT/US06/03160, dated Apr. 9, 2009.

International Preliminary Report on Patentability for PCT/US2005/018599, dated Jun. 5, 2007.

International Preliminary Report on Patentability for PCT/US2008/05503, mailed Sep. 17, 2009.

International Preliminary Report on Patentability for PCT/US2009/032341, mailed Aug. 12, 2010.

Communication for European Patent Application No. 07250848.4, dated May 29, 2008.

Communication for European Patent Application No. 07250848.4, dated Aug. 13, 2007 (EESR enclosed).

Communication for European Patent Application No. 07250844.3, dated Mar. 28, 2008.

Communication for European Patent Application No. 05755530.2, dated Sep. 6, 2007.

Communication for European Patent Application No. 08731127.0, dated Oct. 13, 2009.

European Search Report for Application No. 05755530.2, dated Mar. 26, 2012 (3 Pages).

[No Author Listed] Solaris 9 resource manager software. A technical white paper. Sun Microsystems, Inc., Palo Alto CA, 2002, 37 pages. XP-002291080. Retrieved Aug. 3, 2004 from <http://wwws.sun.com/software/whitepapers/solaris9/srm.pdf>.

Damerau, F.J., Problems and some solutions in customization of natural language database front ends. ACM Transactions on Information Systems, vol. 3, No. 2, Apr. 1, 1985, pp. 165-184.

Devarakonda et al., Predictability of process resource usage: A measurement-based study on UNIX. IEEE Transactions on Software Engineering. 1989;15(12):1579-1586.

European Office Action issued Aug. 31, 2012 for Application No. 05755530.2 (4 Pages).

European Office Action issued Jul. 9, 2012 for Application No. 07250844.3 (8 Pages).

Extended European Search Report issued Oct. 29, 2012 for Application No. 08731127.0 (8 Pages).

Johnson et al., Sharing and resuing rules—a feature comparison of five expert system shells. IEEE Expert, IEEE Services Center, New York, NY, vol. 9, No. 3, Jun. 1, 1994, pp. 3-17.

Gajos et al. Supple: Automatically Generating User Interfaces. IUI 2004, 8 pages.

* cited by examiner

SYSTEMS AND METHODS FOR DISTRIBUTED RULES PROCESSING

BACKGROUND OF THE INVENTION

The invention relates to digital data processing and, more particularly, for example, to distributed processing of rules bases.

Computer systems that facilitate business operations based on information specific to an industry or enterprise are well known in the art. These typically rely on rules identifying situations that are expected to arise during enterprise operation and the applicable responses. Such systems have been used in a range of applications, from health care to automotive repair. The rules on which they rely come from experts in the field, from the collective experience of workers on the "front line," or a combination of these and other sources.

Though many computer systems of this sort incorporate application-specific knowledge directly into source code (using, for example, a sequence of "if . . . then . . . else" statements, or the like), more complex systems store that knowledge separately from the programs that access it. Some use "rules bases" that store application-specific information in tables, database records, database objects, and so forth. Examples of systems of this type are disclosed in commonly assigned U.S. Pat. No. 5,826,250, entitled "Rules Bases and Methods of Access Thereof" and U.S. Pat. No. 7,640,222, entitled "Rules Base Systems and Methods with Circumstance Translation," the teachings of both of which are incorporated herein by reference.

These and other rules-based business process management (BPM) applications are commonly used in enterprise computing, for example, where they facilitate a range of business operations, from marketing to manufacturing to distribution to technical support. By way of example, a BPM application can implement data-processing workflows to support the processing of transactional data ranging from customer service requests received by retail and banking enterprises to the routing and resolution of health care claims by insurance enterprises.

With increasing frequency, enterprise software applications incorporate architectures that permit their use "in the cloud," that is, over the Internet, with computing resources delivered up to each user on demand. In a sense, this extends the client-server model of past eras from the physical confines of the enterprise to the expanse of the world.

Where a common architecture of the past might provide for software that executes on a server, e.g., located at enterprise headquarters, and that processes requests entered by support personnel at the enterprise's branch offices, the new cloud architectures permit servicing of requests by servers located around the world. In operation, any given request by a user on a client device might as well be attended to by a server located in a neighboring state as in a neighboring country. Thus, while cloud applications are often initially tested behind an enterprise firewall, they are typically architected for final deployment outside that firewall, on a dynamically changing set of third-party servers (e.g., owned by Amazon, SalesForce, Google, or other cloud-computing providers).

BPM applications can be deployed in the cloud, like other enterprise applications. However since business process management often goes to the heart of the enterprise, chief executives, IT directors, and corporate boards have yet to fully embrace this model, mainly, for fear that storing rules bases and/or transactional data exposes them to theft or wrongful disclosure.

Other software applications are evolving similarly. Those that traditionally ran solely on the "desktop," are now increasingly being executed in the cloud. Word processing is one example. Microsoft, Google and other software providers would as soon enterprise (and other) customers store documents and execute word processing via the cloud, as via locally deployed desktop applications. Unfortunately, this results in uneven usage of information technology resources, with network infrastructure and desktop computers being alternately overwhelmed and underutilized, depending on the cycle of the day, month and year.

An object of this invention is to provide improved systems and methods for digital data processing. A more particular object is to provide improved systems and methods for business process management, for example, rules processing.

A further object is to provide such improved systems and methods as facilitate deployment of BPM and other rules-processing applications on multiple digital data processors.

A still further object is to provide such improved systems and methods as facilitate such deployment in distributed environments, such as, for example, in cloud computing environments.

Yet a still further object is to provide such improved systems and methods as provide better security for BPM and other rules-processing applications in such distributed environments.

Still yet a further object is to provide such improved systems and methods as better utilize computing and networking resources in applications so distributed.

SUMMARY OF THE INVENTION

The foregoing are among the objects attained by the invention, which provides in some aspects a distributed rules processing system that includes first and second digital data processors that are coupled to one another by one or more networks. A rules base and a transactional data base are each coupled to one of the digital data processors; both may be coupled to the same digital data processor or otherwise.

One or more coordination modules (e.g., "proxies"), each of which is associated with a respective one of the digital data processors, makes available to a selected one of those digital data processors from the other of those digital data processors (i) one or more selected rules from the rules base, and/or (ii) one or more data from the transactional database on which those rules are to be executed. The selected digital data processor executes one or more of the selected rules as a rules engine, executes one or more of the selected rules using a rules engine, and/or processes one or more data from the transactional database with rules executing using a rules engine.

According to related aspects of the invention, the first and second digital data processors of a distributed rules processing system, e.g., of the type described above, can be disposed remotely from one another and can coupled for communication by the Internet, as well optionally by local area networks, wide area networks, and so forth. A firewall and/or other such functionality that is coupled to one or more of those networks prevents the selected digital data processor from accessing from the other digital data processor (i) the selected rules and/or (i) the data on which those rules are to be executed.

Further related aspects of the invention provide a distributed rules processing system, e.g., of the type described above, wherein one or more of the coordination modules make the selected rules and/or data available to the selected digital data processor from the other digital data processor in response to a request from the rules engine.

Thus, by way of example, in a system according to the foregoing aspects of the invention, the first digital data processor can include a rules base, e.g., for processing credit card information. The second digital data processor can, likewise, include a data base of transactional data, e.g., pertaining to opening of credit card account, purchases against the credit cards, refunds, and so forth.

According to one operational scenario of such a system (and to illustrate methods according to further aspects of the invention) a rules engine operating, for example, on the first digital data processor can utilize a proxy operating, for example, on the second digital data processor to access transactional data that is "behind the firewall" on the second digital data processor for processing by the rules engine with rules already accessible to the first data data processor (e.g., on account of its inclusion of and/or coupling to the rules base).

To that end, by way of non-limiting example, in related aspects of the invention, the coordination modules (or proxies) make the selected rules and/or data available to the selected digital data processor from the other digital data processor by opening one or more communications ports on that other digital data processor.

Continuing the above example, in a related operational scenario, a coordination module executing on the first data processor can respond to transactional data base access requests generated by the rules engine to determine whether that data base is coupled to the first digital data processor and, if not, to cooperate with the coordination module on the second digital data processor to make the transactional data available to the rules engine from the second digital data processor.

Conversely, according to the operational scenario of a system paralleling those described in the examples above, a rules engine executing on the second digital data processor can utilize a proxy operating, for example, on the first digital data processor, to access rules necessary to process transactional data already accessible to the data data processor (e.g., on account of its inclusion of and/or coupling to the transactional data base).

In other related aspects, the invention provides a distributed rules processing system, e.g., of the type described above, in which one or more of the coordination modules make the selected rules and/or data available to the selected digital data processor from the other digital data processor in response to a request from that other digital data processor.

In further related aspects of the invention, a request made from the other digital data processor in a distributed rules processing system, e.g., of type described above, is made by a rules engine executing on that other digital data processor.

Continuing the example above (and to illustrate methods according to still further aspects of the invention), in a system according to the foregoing aspects of the invention, a rules engine operating on the first digital data processor can utilize the proxy operating on the second digital data processor to access some transactional data in the data base on the second digital data processor for processing by the rules engine on the first digital data processor (and/or, conversely, to store transactional data processed by that rules engine to that transactional data base). It can also effect, through use of that proxy and/or its counterpart on the first digital data processor, transfer of selected rules to the second digital data processor for execution by its rules engine, e.g., on other data stored (and/or to be stored) in the transactional database.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
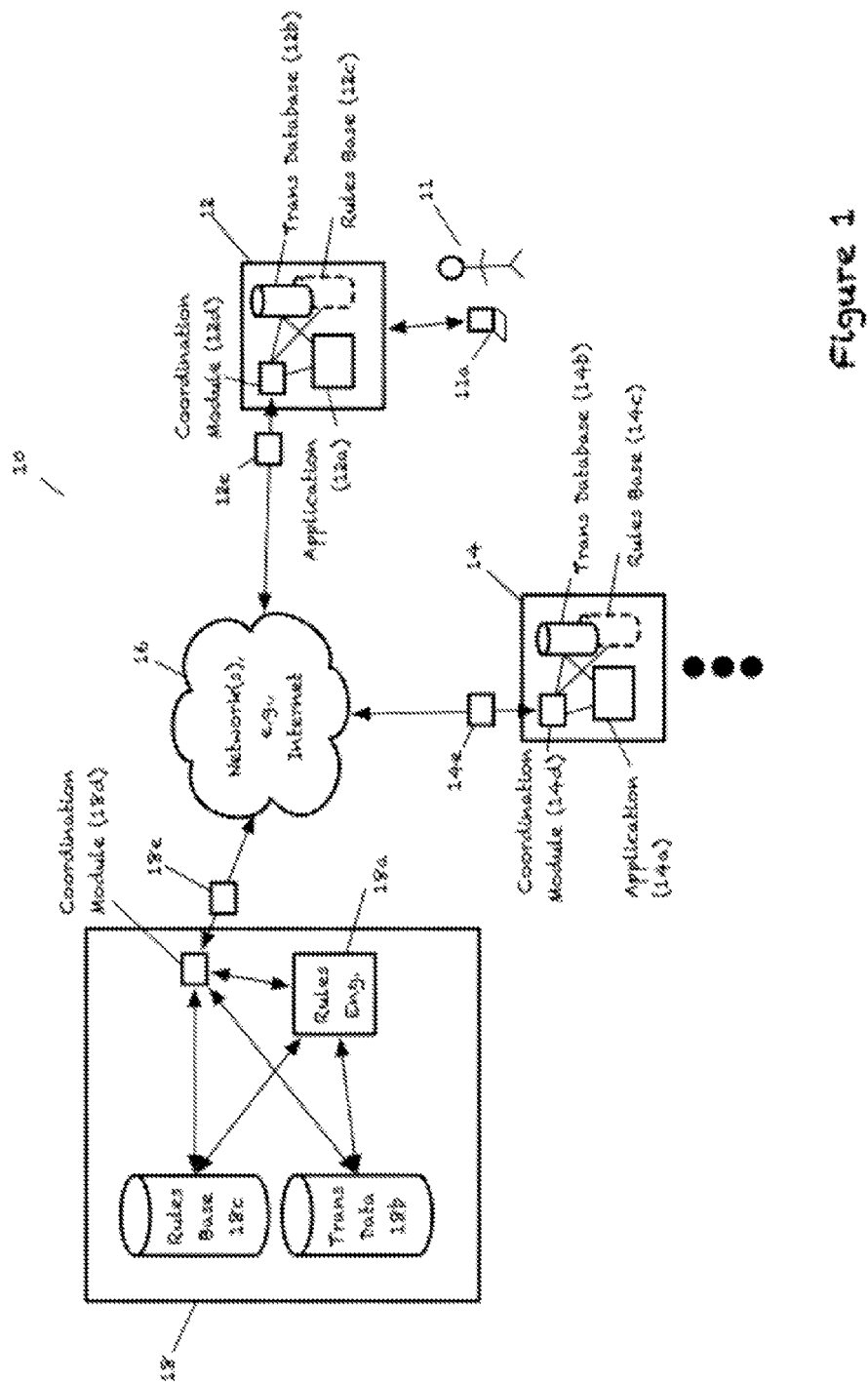
FIG. 1 depicts a digital data processing system for distributed rules processing according to one practice of the invention.

FIG. 1 depicts a digital data processing system 10 for distributed processing in a rules-based system according to one practice of the invention. The illustrated system includes client (or "tenant") digital data processors 12, 14 that are coupled via network 16 for communication with server digital data processor 18.

The client digital data processors 12, 14 are conventional desktop computers, workstations, minicomputers, laptop computers, tablet computers, PDAs or other digital data processing apparatus of the type that are commercially available in the marketplace and that are suitable for operation in the illustrated system as described herein, all as adapted in accord with the teachings hereof.

The server digital data processor 18 is, likewise, a digital data processing apparatus of the type commercially available in the marketplace suitable for operation in the illustrated system as described herein, as adapted in accord with the teachings hereof. Though the server 18 is typically implemented in a server-class computer, such as a minicomputer, it may also be implemented in a desktop computer, workstation, laptop computer, tablet computer, PDA or other suitable apparatus (again, as adapted in accord with the teachings hereof).

Network 16 comprises one or more networks suitable for supporting communications among and between illustrated digital data processors 12, 14, 18. Illustrated network 16 comprises one or more public networks, specifically, the Internet, though, in other embodiments, it may include (instead or in addition) one or more other networks of the type known in the art, e.g., local area networks (LANs), wide area networks (WANs), metropolitan area networks (MANs), and or Internet(s).

Illustrated client computer 12 comprises central processing, memory, storage and input/output units and other constituent components (not shown) of the type conventional in the art that are configured to form application 12a, transaction database 12b, rules base 12c, and coordination module 12d, in accord with the teachings hereof. One or more of these constituent components, and/or portions thereof, may be absent in various embodiments of the invention. Thus, for example, as suggested by dashed lines, the digital data processor 12 may not include a rules base. Conversely, it may include a portion of a rules base but not transaction database or it may include neither. In other embodiments, it may include a coordination module 12d (described below) but not a transaction database, rules base or an application, all by way of non-limiting example.

The central processing, memory, storage and input/output units of client digital data processor 12 may be configured to form and/or may be supplemented by other elements of the type known in the art desirable or necessary to support elements 12a-12d in accord with the teachings hereof, as well as to support other operations of the digital data processor 12. These can include, by way of non-limiting example, peripheral devices (such as keyboards and monitors), operating systems, database management systems, and network interface cards and software, e.g., for supporting communications between digital data processor 12 and other devices over network 16.

Digital data processor 12 is coupled to network 16 via firewall 12e. This is a conventional device of the type known in the art (as otherwise configured in accord with the teachings hereof) suitable for blocking unauthorized access, yet, permitting authorized access, to the digital data processor 12, including (but not limited to) data and rules bases 12b, 12c.

Firewall 12e, which is constructed and operated in the conventional manner known in the art, may comprise a "hardware" (or stand-alone) firewall and/or it may comprise a software firewall configured from the constituent and/or other components of digital data processor 12, again, in the conventional manner known in the art.

The constituent components of illustrated client digital data processor 14 may similarly be configured in accord with the teachings hereof to form application 14a, transaction database 14b, rules base 14c, and coordination module 14d. As well, they may be supplemented by other elements of the type known in the art desirable or necessary to support elements 14a-14d in accord with the teachings hereof, as well as to support other operations of the digital data processor 14. The client digital data processor 14 may also include a firewall 14e, e.g., constructed and operated like device 12e, discussed above, to block unauthorized access, yet, permit authorized access, to the digital data processor 14, including (but not limited to) data and rules bases 14b, 14c.

Although digital data processors 12 and 14 are depicted and described in like manner here, it will be appreciated that this is for sake of generality and convenience: in other embodiments, these devices may differ in architecture and operation from that shown and described here and/or from each other, all consistent with the teachings hereof. Moreover, it will be appreciated that although only two closely positioned client devices 12, 14 are shown, other embodiments may have greater or fewer numbers of these devices disposed near and/or far from one another, collocated behind one or more common firewalls 12e, 14e or otherwise.

Like client digital data processors 12, 14, server digital data processor 18 comprises central processing, memory, storage and input/output units and other constituent components (not shown) of the type conventional in the art that are configured in accord with the teachings hereof to form rules engine 18a, transaction database 18b, rules base 18c, and coordination module 18d, one or more of which (and/or portions thereof) may be absent in various embodiments of the invention. The digital data processor 18 may also include a firewall 18e, e.g., constructed and operated like device 12e, discussed above, to block unauthorized access, yet, permit authorized access, to the digital data processor 18, including (but not limited to) data and rules bases 18b, 18c.

Although only a single server digital data processor 18 is depicted and described here, it will be appreciated that other embodiments may have greater or fewer numbers of these devices disposed near and/or far from one another, collocated behind one or more common firewalls 18e or otherwise. Indeed, in preferred such embodiments, the digital data processor 18 is configured as a server on a "cloud" platform, e.g., of the type commercially available from Amazon, Sales-Force, Google, or other cloud-computing providers. As above, those other servers may differ in architecture and operation from that shown and described here and/or from each other, all consistent with the teachings hereof.

Rules bases 12c, 14c, 18c comprise conventional rules bases of the type known in the art (albeit configured in accord with the teachings hereof) for storing rules (e.g., scripts, logic, controls, instructions, metadata etc.) and other application-related information in tables, database records, database objects, and so forth. Preferred such rules and rules bases are of the type described in the aforementioned incorporated-by-reference U.S. Pat. No. 5,826,250, entitled "Rules Bases and Methods of Access Thereof" and U.S. Pat. No. 7,640,222, entitled "Rules Base Systems and Methods with Circumstance Translation," though, rules and rules bases that are architected and/or operated differently may be used as well.

As noted above, not all of these rules bases may be present in any given embodiment. Conversely, some embodiments may utilize multiples rules bases, e.g., an enterprise-wide rules base 18c on the server 18 and domain-specific rules bases on the client devices 12, 14, all by way of example. Moreover, to the extent that multiple rules bases are provided in any given embodiment, they may be of like architecture and operation as one another; though, they may be disparate in these regards, as well.

In some embodiments, rules may comprise meta-information structures. These are structures that can include data elements and/or method elements. The latter can be procedural or declarative. In the former regard, for example, such a structure may be procedural insofar as it comprises one or more of a series or ordered steps. In the latter regard, such a structure may be declarative, for example, insofar as it sets forth (declares) a relation between variables, values, and so forth (e.g., a loan rate calculation or a decision-making criterion), or it declares the desired computation and/or result without specifying how the computations should be performed or the result achieved. By way of non-limiting example, the declarative portion of a meta-information structure may declare the desired result of retrieval of a specified value without specifying the data source for the value or a particular query language (e.g., SQL, CQL, .QL etc.) to be used for such retrieval. In other cases, the declarative portion of a meta-information structure may comprise declarative programming language statements (e.g., SQL). Still other types of declarative meta-information structures are possible.

While some rules may comprise meta-information structures that are wholly procedural and others may comprise those that are wholly declarative, the illustrated embodiment also contemplates rules that comprise both procedural and declarative meta-information structures, i.e., rules that have meta-information structure portions that are declarative, as well as meta-information structure portions that are procedural.

Furthermore, rules of the illustrated embodiment that comprise meta-information structures may also reference and/or incorporate other such rules, which themselves may, in turn, reference and/or incorporate still other such rules. As a result, editing such rule may affect one or more rules (if any) that incorporate it.

An advantage of rules that comprise meta-information structures over conventional rules is that they provide users with the flexibility to apply any of code-based and model-driven techniques in the development and modification of software applications and/or computing platforms. Particularly, like models in a model-driven environment, meta-information structures comprise data elements that can be used to define any aspect of a complex system at a higher level of abstraction than source code written in programming languages such as Java or C++. On the other hand, users may also embed programming language statements into meta-information structures if they deem that to be the most efficient design for the system being developed or modified. At runtime, the data elements of the meta-information structures along with programming language statements (if any) are automatically converted into executable code by a rules engine (e.g., 18a).

Thus, in some embodiments, rules may be the primary artifacts that get created, stored (e.g., in a rules base) or otherwise manipulated to define and/or modify the overall functionality of rules-based applications that may automate and/or manage various types of work in different business domains at run-time. By way of non-limiting example, a plurality of rules stored in a rules base (e.g., 12c, 14c, 18c) may be configured to define all aspects (e.g., user interface, decision logic, integration framework, process definition, data model, reports, security settings etc.) of a software application. Such a software application may include specialized software that is used within a specific industry or a business function (e.g., human resources, finance, healthcare, telecommunications etc.), or it may include a cross-industry application (e.g., a project management application), or any other type of software application. As the software application executes on a digital data processor (e.g. any of 12, 14 and 18), any portion of the rules that define the application may be retrieved from a rules bases (e.g. any of 12c, 14c and 18c) and processed/executed (e.g., using a rules engine 18a as defined below) in response to requests/events signaled to and/or detected by the digital data processor at run-time.

Transactional data bases 12b, 14b, 18b comprise conventional data bases of the type known in the art (albeit configured in accord with the teachings hereof) for storing corporate, personal, governmental or other data that may be any of generated, stored, retrieved and otherwise processed (hereinafter, collectively referred to as "processed") by rules in one or more of the rules bases 12c, 14c, 18c. The data may be financial data, customer records, personal data, run-time data related to an application, or other type of data and it may be stored in tables, database records, database objects, and so forth.

As above, not all of the illustrated transactional data bases may be present in any given embodiment. Conversely, some embodiments may utilize multiple transactional database bases, e.g., an enterprise-wide data base 18b on the server 18 and branch-office specific data bases on the client devices 12, 14, all by way of example. Moreover, to the extent that multiple transactional data bases are provided in any given embodiment, they may be of like architecture and operation as one another; though, they be disparate in these regards, as well.

Illustrated digital data processor 18 also includes rules engine 18a of the type conventionally known in the art (albeit configured in accord with the teachings hereof) for use in processing/executing rules from a rules base in order to process data in (and/or for storage to) a transactional database, e.g., in connection with events signaled to and/or detected by the engine. Preferred such rules engines are of the type described in the aforementioned incorporated-by-reference U.S. Pat. No. 5,826,250, entitled "Rules Bases and Methods of Access Thereof" and U.S. Pat. No. 7,640,222, entitled "Rules Base Systems and Methods with Circumstance Translation" and/or U.S. patent application Ser. No. 11/681,269, filed Mar. 2, 2007, entitled "Proactive Performance Management For Multi-User Enterprise Software Systems," the teachings too of which are incorporated by reference herein—all as adapted in accord without the teachings hereof.

The rules engine 18a may be implemented in a single software program, in multiple software programs/modules, or a combination of software modules/programs. Moreover, it may comprise programming instructions, scripts, or rules (e.g., rules stored in rules base 18c) and/or a combination thereof.

Though, in the illustrated embodiment in FIG. 1, the rules engine 18a executes on the server 18, in other embodiments, the techniques described herein may be employed to execute the rules engine 18a on or over multiple digital data processors (e.g., 12, 14 and 18). For instance, the rules engine 18a may initially be invoked for execution on a single digital data processor (e.g., 18). Subsequently, portions of it (or, potentially, the entirety of it) may be apportioned, distributed and executed over multiple digital data processors using the techniques described herein.

Such distributed execution of the rules engine can be advantageous, by way of non-limiting example, when execution of an enterprise-wide BPM application necessitates access to sensitive corporate or personal data during intermediate processing steps. For example, in an enterprise with decentralized record-keeping, the rules engine 18a can be utilized to generate a summary report that requires analysis of sensitive personnel-related data maintained in local branch offices. To that end, the engine 18a executes rules for performing preparatory tasks, such as, zeroing out data collection variables and identifying local offices to be queried. The engine 18a also retrieves from rules base 18c or otherwise generate rules that will serve as rules engines (e.g., 12a, 14a) customized or otherwise suited for execution on digital data processing equipment 12, 14 at those offices, as well as rules for execution on those engines 12a, 14a to analyze (and anonymize) sensitive data from the respective offices. Both the rules engine-defining rules and the data analysis rules are distributed to the equipment 12, 14, where they perform these functions and send the requisite information back to server 18 for reporting the BPM application executing there. Such distributed execution has the advantage of permitting the BPM application executing using engine 18a to generate an enterprise-wide report, without necessitating the transmission of sensitive data outside the confines of the local offices.

By way of further example, the rules engine 18a can have two distinct portions, e.g., one that embodies the algorithm for rule selection (e.g., in the manner of the rule finder disclosed in U.S. Pat. No. 5,825,260, assigned to the assignee hereof and incorporated by reference herein), and the other that generates/executes the executable code once the requisite rule has been selected. The rules engine 18a (or other functionality) can apportion and distributed these portions separately as required.

Take, for example, an instance where server 18 gets a request for executing a "loan validation" process for a specific context. Server 18 stores rules for multiple versions of the "loan validation" process for different contexts. However, the server does not have the computing power to execute the 'rule finder' algorithm to select the right version and/or the server doesn't have the code generation portion of the engine to execute the selected rule. Server retrieves the rules for all versions of "loan validation" process and transmits them along with the rule selection portion of the engine to a remote digital data processor that has installed thereon the code generation portion of a rules engine. Upon receiving the rule finder portion of the engine along with the rules for all versions, the correct loan validation process is selected and executed on the target digital data processor.

The foregoing are examples those skilled in the art will appreciate that still other ways of implementing/executing the rules engine 18a are possible. By way of non-limiting example, the rules engine 18a may have additional distinct components/portions that can be apportioned and distributed separately. These may include (but are not limited to) a data access component used for processing data during rule execution, a session management component for keeping track of activity across sessions of interaction with a digital data processor and/or a performance monitoring component for monitoring and interacting with various system resources/event logs in order to manage performance thresholds. Still other types of distinct components/portions may be part of the rules engine 18*a*.

Applications 12*a* and 14*a*, of digital data processors 12, 14, respectively, may too comprise rules engines of the type described above, as adapted in accord with the teachings hereof. These applications may be configured (e.g., at least partially using rules stored in a rules base as described above) as stand-alone applications and/or may be embedded in (or coupled) to other software applications, e.g., web browsers. While in some embodiments, such applications 12*a*, 14*a* are architected and operated similarly to rules engine 18*a*, in other embodiments they embody a subset of the functionality of engine 18*a*, e.g., suited to the processing resources and/or demands of the digital data processors 12, 14 upon which they operate. Instead or in addition, such applications 12*a*, 14*a* can comprise other functionality than that provided in rules engine 18*a*, again, for example, suited to the processing resources and/or demands of the digital data processors 12, 14 upon which they operate.

For sake of simplicity, the discussion that follows focuses on aspects of operation of rules engine 18*a*; it will be appreciated that other rules engines (e.g., 12*a*, 14*a* in certain embodiments) may operate similarly in these regards.

As noted above, rules engine 18*a* processes/executes rules from a rules base in order to process data in (and/or for storage to) a transactional database. In instances where the engine 18*a* executes rules from rules base 18*c* in order to process data in (and/or store data to) database 18*b*, the engine 18*a* may operate in the conventional manner known in the art. However, where any of (i) the data to be accessed (or stored) is resident in a data base 12*b*, 14*b* of another of the digital data processors, (ii) the rules to be executed (including, potentially, those defining the rules engine 18*a* or a portion thereof) are contained in a rules base 12*c*, 14*c* of another of those digital data processors, and (iii) the rules (again, potentially, those defining the rules engine 18*a* or a portion thereof) are to be executed using the rules engine 12*a*, 12*b* of another of those digital data processors, the rules engine 18*a* works with one or more of the coordination modules to effect the desired processing. Even in instances where the rules, portions of the engine, and/or data required to effect the desired processing is local to digital data processor 18, the rules engine 18*a* may work with the coordination modules (e.g., 12*d*, 14*d*, 18*d*) to effect the desired processing over multiple digital data processors (e.g., for access to more computing resources/power) in accord with the teachings hereof.

In this regard, coordination modules 12*d*, 14*d*, 18*d* comprise functionality resident on (and/or coupled to) each of the respective processors 12, 14, 18 that facilitate access to and transfer of rules, the rules engine or portion thereof, or data (and, preferably, all three) between the digital data processors. In this regard, operation of the module(s) 12*d*, 14*d*, 18*d* can include one or more of (i) obviating obstacles presented by firewalls 12*e*, 14*e*, 18*e* or other functionality to such interprocessor accesses and transfers, (ii) effecting such access and transfers, and (iii) querying a digital data processor to determine whether it has resources (e.g., a rules base, a transactional data base, a portion of or the entire rules engine, and/or computing power) to facilitate the completion of a task (e.g., by executing a given one or more rules on a given set of data).

As above, not all of the coordination modules 12*d*, 14*d*, 18*d* are utilized in all embodiments. Conversely, other embodiments may utilize additional such modules, e.g., one module per digital data processor for facilitating rules access/transfer between digital data processors, one module for facilitating transaction access/transfer, and so forth. Likewise, some such modules could be directed to querying digital data processors for resources, while others are directed to access and transfers. These and other such variations are within the ken of those of ordinary skill in the art based on the teachings hereof.

The modules 12*d*, 14*d*, 18*d* may comprise stand-alone functionality stored and executing within each respective digital data processors 12, 14 18. Alternatively, they may comprises functionality that is embedded in the rules engine 18*a* and/or applications 12*a*, 14*a* and/or into other applications or operating system functions resident on the respective devices 12, 14, 18. Moreover, in embodiments that include multiple such modules 12*d*, 14*d*, 18*d*, functionality may be distributed and/or divided among them.

Still further, although the modules 12*d*, 14*d*, 18*d* are shown forming part of the respective digital data processors 12, 14, 18 in the illustrated embodiment, in other embodiments one or more of those modules may execute on still other digital data processors (not shown) that are in communication coupling with the respective processors 12, 14, 18 and that otherwise provide the functionality described here.

Figure 2:
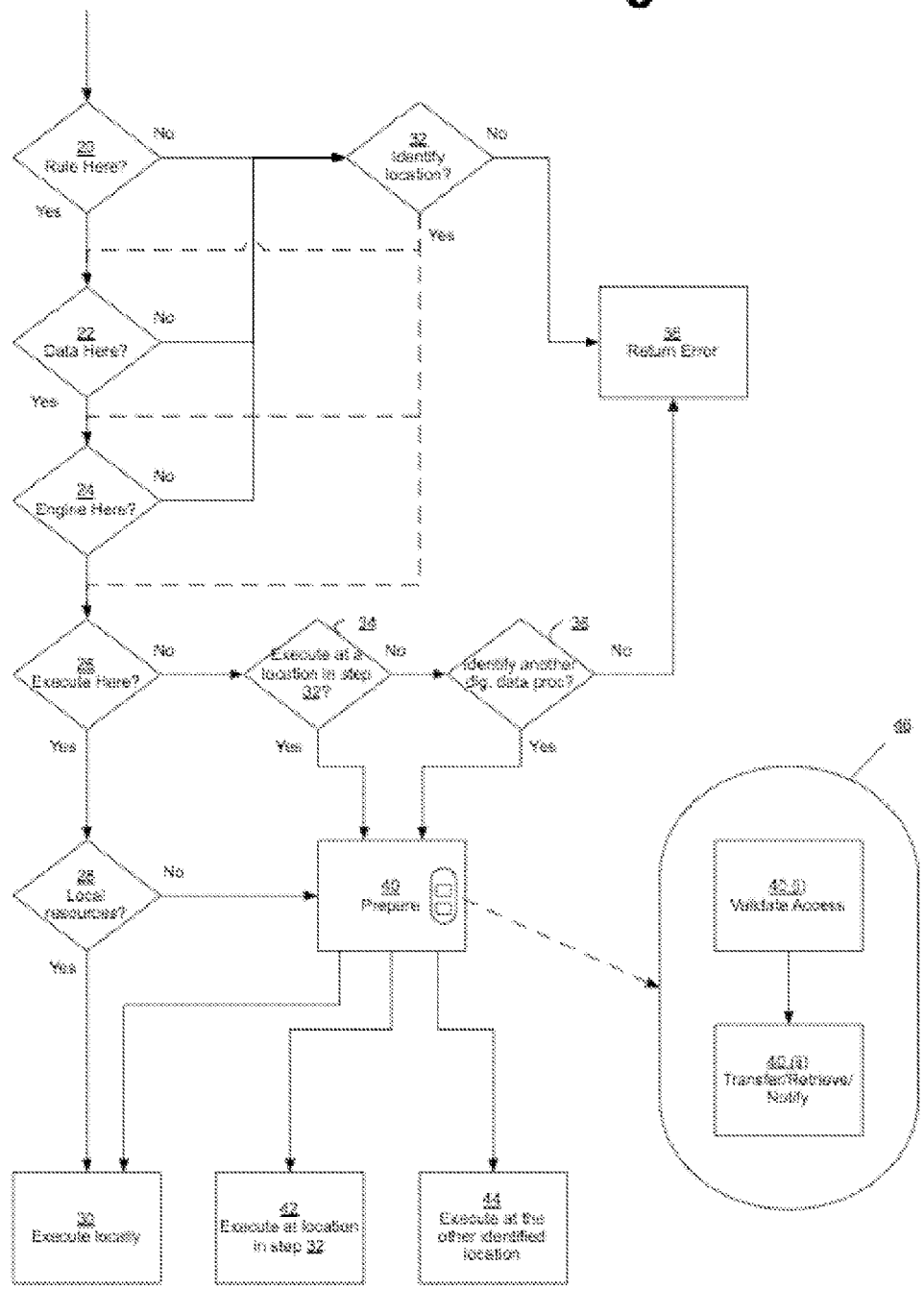
FIG. 2 depicts a method of operation of a coordination module in a system of FIG. 1.

Operation of a coordination module 18*d* in accord with one practice of the invention is illustrated in FIG. 2. It will be appreciated that the sequence of steps shown in that drawing and discussed below is by way of example and that other embodiments may perform the same or different functions using alternate sequences of steps.

In step 20, the module, which may be coupled to a local rules engine 18*a*, responds to a request for access to a rule by determining if that rule is present in a rules base 18*c* local to the digital data processor 18—and, for example, it is therefore accessible to a local engine 18*a* without crossing the firewall 12*e*, 14*e* of another digital data processor. The module 18*d* can make that determination by checking for the presence of the local rules base 18*c* and/or, if present, by determining if the requested rule itself is present. Alternatively, or in addition, the module 18*d* can make the determination by checking parameters or other indicators of rule presence, e.g., in the rule request signaled to any of the module 18*a* and the engine 18*a* and/or request made by the engine 18*a*. The parameters or other indicators of rule presence may also be found in a registry of the digital data processor 18 and/or elsewhere.

If the determination of step 20 is in the affirmative, operation proceeds to step 22, where the module 18*d* determines if data implicated by the rule (e.g., data to be processed by the rule or otherwise necessary for its execution) is present in a data base 18*b* local to the digital data processor 18—and, again, for example, it is therefore accessible to the local engine 18*a* without crossing the firewall 12*e*, 14*e* of another digital data processor. The module 18*d* can make that determination by checking for the presence of the local data base 18*b* and/or, if present, by determining if the requested data are present. Alternatively, or in addition, the module 18*d* can make the determination by checking parameters or other indicators of data presence, e.g., in the rule request signaled to any of the module 18*d* and the engine 18*a* and/or request made by the engine 18*a*. The parameters or other indicators of rule presence may also be found in a registry of the digital data processor 18 and/or elsewhere.

If the determination of step 22 is affirmative, operation proceeds to step 24, where the module 18*d* determines if the portion of rules engine (e.g., 18*a*) that is required to execute the requested rule is present locally on digital data processor 18. To this end, the module can query for local presence on digital data processor 18 of component(s)/module(s) that make up requisite portions(s) of rules engine. In other embodiments, e.g., where those requisite portion(s) are implemented using rules, the module 18*d* can determine, for example, if those rules are locally present by querying a local database/repository (e.g., rules base 18*c*, transaction data base 18*b*). Alternatively, or in addition, the module can check parameters or other indicators of engine presence, e.g., in the rule request signaled to any of the module 18*d* and the engine 18*a* and/or request made by the engine 18*a*, in a registry of the digital data processor 18 and/or elsewhere.

If the determination of step 24 is in the affirmative, operation proceeds to step 26, where the module 18*d* determines if the rule is to be executed locally, i.e., on digital data processor 18 or whether it is to be executed remotely, e.g., on digital data processors 12, 14. The module 18*d* can make that determination using a variety of methods including, but not limited to, querying a local rules engine (e.g., 18*a*) and/or by checking parameters or other indicators, e.g., in the rule request signaled to any of the module 18*d* and the engine 18*a* and/or request made by the engine 18*a*. The parameters or other indicators of rule presence may also be found in a registry of the digital data processor 18 and/or elsewhere. Alternatively, or in addition, the module 18*d* can make the determination based on load-balancing, network speed and traffic, data coherency or other factors within the ken of those of ordinary skill in the art based on the teachings hereof.

If the determination in steps 20, 22, 24 and 26 is in the affirmative—that is, all resources required to execute the requested rule are present locally at digital data processor 18 and the rule is to be executed there, the determination in step 28 is affirmative and the operation proceeds to step 30, where the module 18*d* defers to local engine 18*a* for execution of the requested rule on the required data. The engine 18*a* (or the required portion thereof) proceeds by accessing the rule and data in the local rules and data bases 18*b*, 18*c*, and by executing the rule to process the data accordingly.

If the determination in any of steps 20, 22 and 24 is in the negative—that is, if any of the requested rule, required data and engine (or portion thereof) are not locally present on digital data processor 18, the operation proceeds to step 32, where the module queries one or more other digital data processors (e.g., 12, 14) to determine the location(s) of any of the requested rule, required data and engine (or portion thereof). By way of non-limiting example, the module 18*d* can determine the location of the requested rule (and corresponding rules base), required data and engine (or portion thereof) by checking parameters or other indicators, e.g., in the rule request signaled to any of the module 18*d* and the engine 18*a* and/or request made by the engine 18*a*, in a registry of the digital data processor 18 and/or elsewhere. Alternatively, or in addition, module 18*d* can query the digital data processors 12, 14 directly to determine if any of the required/requested resources are maintained by them. Preferably, this is accomplished by communication between module 18*d* and its counterparts 12*d*, 14*d* on each of digital data processors 12, 14—which modules 12*d*, 14*d* can, themselves, query the local digital data processor 12, 14 for the requisite resource(s).

If the determination in step 32 is in the negative for any of the required/requested resources, the operation proceeds to and terminates at step 38 where the coordination module returns an error message in response to the requested rule indicating the absence or unavailability of any of the requested rule, required data and engine (or portion thereof).

If the determination in step 32 is in the affirmative for any of the requested/required resources that were not already present locally at digital data processor 18 (as previously determined by steps 20-24), the operation proceeds to step 26 to make the decision of local versus remote execution of the requested rule as described above. If the determination in step 26 is affirmative, at least one of the requested rule, required data and engine (or portion thereof) that is located remotely at another digital data processor (e.g., 12 or 14) as identified in step 32, is retrieved in step 40 before executing the requested rule locally on digital data processor 18 in step 30. As indicated by the callout 46, such retrieval is performed by the module 18*d*, following a negative determination in step 28 by (i) validating that the one or more digital data processors identified in step 32 (e.g., 12 and/or 14) will grant access to the requested/required resource(s) and, (ii) retrieving that/those resource(s) from those one or more digital data processors (i.e., 12 and/or 14) to digital data processor 18.

In regard to step 40(*i*), the module 18*d* can validate that the one or more identified digital data processors will grant access by querying the digital data processor(s) identified in step 32 accordingly. This can be done, for example, through communication with the module 12*d*, 14*d* of the identified digital data processor, which module can validate the presence of any of the requested/required resource (if it has not already done so). In some embodiments, the validating module (e.g., 12*d* or 14*d*) can open a communications port in the respective digital data processor and can prepare the requested/resource for access via that port.

In regard to step 40(*ii*), the module 18*d* retrieves and/or transfers the requested/required resource from the one or more identified digital data processors to digital data processor 18 for local execution. In some embodiments, a local rules engine 18*d* (if already present) may access the requested/required resource (e.g., data, transaction database, rule and/or rules base) directly from the identified digital data processor, e.g., via a port opened in step 40(*i*). In other embodiments, the module 18*d* may also transfer one or more requested/required resources to an identified digital data processor (e.g., 12 or 14) for the requested processing to be performed remotely at the identified digital data processor. Alternatively, or in addition, the module 18*d* may also notify the identified digital data processor (e.g., 12 or 14) and, preferably, its respective coordination module, identified in step 32, passing to it the relevant information for the requested processing to be performed (e.g., identity of the rule to be executed). The identified digital data processor may perform the requested processing using the resources/information provided to it. In other embodiments where the required resources are not transferred along with the relevant information, the identified digital data processor may perform the requested processing by utilizing the methodology of FIG. 2 itself in order to access the required resources in connection therewith. The discussion that follows provides further details about this step.

Upon completion of step 40, control transfers to any of steps 30, 42 or 44 depending upon the outcome of the previous steps in the operation of the coordination module 18*d*, as indicated in the drawing. Thus, continuing with the current example of retrieving requested/required resources in step 40 from one or more identified digital data processors (e.g., 12 and/or 14) for local execution at digital data processor 18, control transfers to step 30 to complete the requested processing. However, if the determination in step 26 is in the negative—that is, it is determined that the requested rule is to be executed remotely, then the appropriate location for the completion of such remote processing is based upon a combination of steps 34-44 as well as the outcome of previous steps 20-24.

By way of non-limiting example, despite the local presence of all the requested/required resources on digital data processor 18 (i.e., affirmative responses in steps 20-24), a negative determination in step 26 may be due to parameters or other indicators in a local registry of the digital data processor 18 and/or e.g., in the rule request signaled to any of the module 18d and the engine 18a and/or request made by the engine 18a. In this case, there is no previously identified location from step 32. Thus, the response to step 34 is in the negative and the operation proceeds to step 36 where the module 18d determines if there is another digital data processor (e.g., 12, 14) suited for executing the requested rule. In some embodiments, it makes that determination by querying the local rules engine 18a and/or by checking the parameters or other indicators as mentioned above. Alternatively, or in addition, the module 18d can make the determination based on load-balancing, network speed and traffic, availability of the required/requested resources (or portions thereof) on one or more other digital data processors, data coherency or other factors within the ken of those of ordinary skill in the art based on the teachings hereof. For example, a query during the operation at step 36 (or at a prior step) may reveal that an alternative digital data processor with higher computing power than processor 18 and/or another digital data processor identified in a local registry, has all of the required/requested resources. In that case, module 18d may simply notify the alternative digital data processor (and/or its coordination module) to perform the requested processing as opposed to performing it locally or remotely at the other digital data processor that was identified in the local registry. More generally, this example is also reflective of some embodiments discussed throughout this document that may involve scenarios and/or steps where duplicate versions, or at least versions that are comparable in terms of functionality, of one or more requested/required resources may exist at multiple locations If the determination in step 36 is negative, the operation proceeds to and terminates at step 38 in the illustrated embodiment where the coordination module 18d returns an error message indicating the absence or unavailability of a suitable digital data processor for remote execution of the requested processing/rule. In other embodiments, if the requested/required resources are present locally, the coordination module may ignore the negative outcome of step 26 and execute the requested rule locally as default if a suitable remote digital data processor (e.g., 12 and 14) is not identified in step 36.

If the determination in step 36 is in the affirmative, coordination module 18d any of transfers the requested/required resources from the digital data processor 18 and/or provides the relevant information to the other identified digital data processor in step 36 e.g., by employing the methodology discussed above in connection with steps 40(i) and (ii). In some embodiments, coordination module 18d may only transfer a portion of the requested/required resources if it is determined (as mentioned above) that another identified digital data processor(s) already possesses the remaining portion of the requested/required resources. Once any such transfer and/or notification is completed in step 40 from digital data processor 18, processing is completed by executing the requested rule remotely in step 44 at the other digital data processor that is identified in step 36.

Preceding the negative determination in step 26, a negative outcome in any of steps 20-24 indicates that at least one of the requested/required resources is not locally present on digital data processor 18 and that one or more digital data processors (e.g., 12 and/or 14) may have been identified in step 32 to locate such requested/required resource as previously discussed. In situations where (i) at least one but not all of the determinations in steps 20-24 are in the affirmative, (ii) the determination in step 26 is in the negative, and (iii) the determination in step 34 is affirmative, the operation proceeds to remotely execute the requested rule. If only one digital data processor was identified in step 32, then module 18d transfers the portion of the requested/required resources at digital data processor 18 (e.g., by employing the methodology discussed above in connection with steps 40(i) and (ii)) to the single digital data processor identified in step 32, where the remaining requested/required resources are located. Once that transfer is completed in step 40, the requested rule/processing is performed remotely in step 42 at the location identified in step 32.

In other embodiments, two or more locations may be identified in step 32—e.g., the required data may be located at digital data processor 12 and the engine may be located at digital data processor 14. In such embodiments, where the step 26 response is negative and the step 34 response is affirmative, module 18d may prioritize all available location options based upon various factors including, but not limited to, prioritization criteria specified in the rule request signaled to module 18d and/or the engine 18a, prioritization rules stored in rules base 18c and/or elsewhere on digital data processor 18. Alternatively, or in addition, module 18d may prioritize all available location options based upon the relative computing resources (e.g., CPU, memory etc.) at each location, network traffic or any other factors within the ken of those of ordinary skill in the art based on the teachings hereof. In any event, module 18d will transfer the portion of the requested/required resources from digital data processor 18 to the highest priority location and once the transfer(s) is completed in step 40, the requested rule/processing is performed remotely at that location in step 42.

A negative determination in step 26 may be followed by a negative determination in step 34. Following the combined negative determinations, an attempt is made via step 36 (as described above) to identify one or more digital data processors other than local processor 18 or the one or more digital data processors identified in step 32.

By way of example, a request may be signaled to coordination module 18d to execute one or more rules that define a plurality of reports. These report rules may be stored locally in rules base 18c and the rules engine 18a required to execute the requested report rules may also be locally present on server digital data processor 18. However, the determination in step 22 may be in the negative because the data to be processed by the requested report rules is not locally present. In such an instance, operation proceeds to step 32 where the coordination module 18d attempts to locate the one or more digital data processors that maintain the required data for reports execution. In one embodiment, the coordination module 18d identifies the location of such digital data processors (e.g., 12, 14) by querying a local registry on digital data processor 18 using parameters or other indicators of data location specified in the rule request that was signaled to the coordination module 18d. The query of the local registry may, for example, reveal that a portion of the required data is located in the transaction database 12b on digital data processor 12 and the remaining portion of the required data is located in the transaction database 14b on digital data processor 14. Next, operation proceeds to step 26 where it may be determined, for example, that the reports will not be executed locally at digital data processor 18 because a pre-requisite for such local execution is data retrieval from digital data processors 12 and 14 over a very slow network connection (e.g., 16). In such an instance, a negative outcome of step 26 is followed by a determination in step 34 of whether to execute the requested report rules remotely on digital data processor 12, 14 or at both locations. This determination may be based on various factors including, but not limited to, load balancing and the correlation between the requested report rules and the required data for requested rule execution at each location. Thus, for example, if CPU speed is sufficient for both digital data processors 12, 14 (e.g., as determined by the registry query mentioned above) and the requested rules can be apportioned to be separately executed at both locations, the operation may proceed through steps 34, 40 and 42 such that the respective portions of the report rules along with the required engine 18a may be transferred appropriately to digital data processors 12 and 14 for remote execution. Alternatively, the determination in step 34 may be that the requested report rules cannot be independently executed at different locations. In that case, the required data and/or transaction data base (e.g., 12b, 14b) is retrieved and/or transferred, along with the requested report rules and engine 18a, to a single digital data processor for execution. In that case, the transfer destination may, for example, be determined based upon a higher CPU speed or any other factor.

As previously mentioned, a retrieval and/or transfer of rules, engine or data between digital data processors 12, 14 and 18 can be accomplished by employing the methodology discussed above in connection with steps 40(i) and 40(ii). Thus, for example, after the determination in step 34 is in the affirmative, the location(s) of the required data for the report rules may be validated (if not already done) through communication between coordination modules 12d, 14d and 18d. In some embodiments, the validating module (e.g., 12d or 14d) can open a communications port in the respective digital data processor and can prepare the required data for access via that port.

Once the ports are opened, the digital data processors 12, 14 and 18 can freely communicate information among each other in step 40(ii). Thus, if it has been determined that digital data processor 12 is to execute the requested report rules, module 18d retrieves the required data portion and/or transaction data base 14b from digital data processor 14 and transfers it to the digital data processor 12. Furthermore, the requested report rules and the required engine 18a are transferred from digital data processor 18 to the target digital data processor 12. Once such retrieval and transfer is completed, the requested report rules are executed in step 42.

In some embodiments, local registries, files or databases (e.g., 12b, 12c, 14b, 14c, 18b, 18c) on any of digital data processors 12, 14 and 18 are updated following the retrieval and/or transfer of rules, rule bases, engine (or any portion thereof), data and transaction data bases from/to such digital data processors. This allows digital data processors 12, 14 and 18 to handle future requests for rule execution accurately and/or efficiently. By way of illustration, once the requested report rules and engine 18a are transferred from digital data processor 18 to digital data processor 12 in the example above, the local registries on any of digital data processors 12, 18 can be updated to reflect such transfer. The operation of coordination module 18d is adjusted accordingly to respond to subsequent requests for execution of those report rules that are any of signaled to and received by the module and/or digital data processor 18.

It will be appreciated that the illustrated embodiment of the operation of coordination module 18d in FIG. 2 is merely exemplary and that certain steps may be omitted, modified or re-ordered without departing from the scope of the disclosure herein. In some embodiments, for example, any of the modules 12d, 14d and 18d may be configured differently based on the business and/or technical requirements that drive the use of the techniques and systems described herein.

By way of non-limiting example, the systems and techniques described herein may be used for provisioning a computing platform as a service (e.g., commercially available Platform-as-a-Service or "PaaS" offerings) over the internet to multiple concurrent users (e.g., from different companies or "tenant" organizations) for application development, testing and/or deployment in a way that provides more flexibility and ease of use without sacrificing data security as compared to the conventional technology/tools available on the market today.

In one such embodiment, the server 18 depicted in FIG. 1 is configured as a cloud-based computing platform comprising hardware and software components (e.g., business process management software) that are used by users 11 from one or more tenant organizations over the internet (e.g., network 16) to develop, test and/or deploy their enterprise applications. Such shared use of resources among multiple tenant organizations on a cloud-based server (e.g., 18) allows each respective tenant to quickly develop, test and deploy their applications while avoiding the cost and complexity of buying the underlying hardware and software components and hosting them in their own data centers.

Despite its many benefits, the multi-tenant architecture have traditionally presented significant challenges related to data security and integration between cloud-based application(s) and the legacy systems/resources located within each of the respective tenants' data centers. These challenges are exacerbated by the business need of many of the tenant organizations who want to take the hybrid approach of leveraging a cloud-based platform (e.g., server 18) to develop/test their application(s) and eventually migrating them for deployment within the respective data centers, and vice versa. Given the prior state of the technology, one major drawback of this hybrid approach is that the integration configuration of the tenant application(s) with respect to other applications and/or systems (e.g., data bases) has to be updated each time the tenant application is migrated in/out of the tenant data center.

Thus, for example, enterprise software applications are typically developed and tested by tenants on a server by creating and/or modifying a plurality rules that may be stored in a rules base present on the server. These rules can define all aspects of such tenant applications including their integration with other applications and/or systems, some of which may be located behind tenant firewalls in the tenant's data center. Thus, in order to enable communication between a tenant application on server and other applications, systems and/or functionality located behind tenant firewalls (hereinafter collectively referred to as "tenant legacy systems"), the integration rules for the tenant applications might attempt to obviate the obstacles presented by the firewalls, e.g., by opening multiple ports in the tenant firewall depending upon, e.g., the integration method (e.g., SOAP, .NET, JAVA, EJB etc.) and/or or the type of tenant legacy system (e.g., SQL database, web service etc.) that is being linked to the tenant application. If that same tenant application is then subsequently deployed within the tenant's data center (i.e., within the tenant firewalls), the integration rules for that application must be reconfigured to establish the direct link between the tenant application and the tenant legacy systems without any intermediate firewall.

Similarly, a tenant may develop and test its application within its data center before migrating it outside its firewall for deployment on a cloud-server. At run-time of the application, a rules engine on the server might execute one or more of the plurality of rules that define the application in response to requests/events received by server e.g., from users within a tenant data center. The data processed during run-time by such rules could potentially either be stored in the database local to the server or it may be stored in remote tenant data bases that may not be accessible to server (e.g., due to firewalls) to effect the desired processing. In such a system, the conventional prior art approach would require that the integration rules of the tenant application be reconfigured upon migration of the tenant application to the cloud-based server in order to avoid any errors/interruptions during execution of such tenant applications on cloud-based servers due to inaccessibility of the required data and/or other resources.

Systems and techniques described herein overcome these drawbacks, for example, when configured as described below, by allowing tenant organizations to simulate their data center environment on an external cloud-based infrastructure (e.g., server 18), thus obviating the need to reconfigure the integration framework of the tenant application(s) upon migration.

This and other benefits of the systems and techniques described herein become apparent in embodiments of the type illustrated FIG. 1 which are configured such that digital data processor 18 operates as a server on a "cloud" platform, e.g., of the type commercially available from Amazon, SalesForce, Google, or other cloud-computing providers. In such embodiments, digital data processors 12 and 14 can be, for example, different "tenant" digital data processors that are in communication with the server 18 over network(s) to access resources (e.g., rules, applications, modules, database, rules bases, data, code, scripts, hardware etc.) that may be either "generic" (i.e., available to users/systems associated with all tenants that are able to connect to the server 18) or "tenant-specific" (i.e., only accessible to users/systems associated with a particular tenant).

As a departure from the conventional approach mentioned above, embodiments of the invention configured as described herein allow tenant organizations to build seamless integration between their enterprise application(s) and the tenant legacy systems without having to reconfigure the application(s) multiple times depending upon where the application(s) is developed, tested and/or deployed. This is accomplished by establishing communication between coordination modules that are installed on the cloud-based server (or wherever the application is developed, tested and/or deployed outside the tenant firewall) as well as within each tenant's data center.

Accordingly, for example, the first time a user 11 signals/sends a request (e.g., HTTP request or otherwise) using digital data processor (e.g., 12, 14, 11a) to access any of the resources that are located on the server 18, any of the coordination module 18d and engine 18a first authenticate the user by e.g., matching parameters or other indicators of user identification in the request with data related to authorized tenant users previously stored in any of the local data bases (e.g., 18b, 18c), registries, files and elsewhere. If the user is authenticated/verified as an authorized user who is able to access resources on server 18 on behalf of a tenant organization, a coordination module (e.g., 12d, 14d) can be transmitted back in response to their initial request. The coordination module that is transmitted back (e.g., 12d, 14d) may be installed on any digital data processor (e.g., 12, 14, 11a) located behind/protected by the firewall of the tenant organization that the user is associated with. In one embodiment, the coordination module transmitted back to the authorized tenant user may be installed in the web browser of the digital data processor being used by the tenant user to communicate with server 18. Upon installation, the coordination module (e.g., 12d, 14d) may prompt the user to provide information related to the tenant legacy systems that may need to be integrated with the tenant application(s) on server 18. This information is then be transmitted to server 18 where it is stored in any of the local data bases (e.g., 18b, 18c), registries, files and elsewhere.

Thus, when an authorized user starts to develop and test applications on server 18 on behalf of tenant organizations and stores the legacy system information for that tenant on the server 18, any of the authorized developers associated with that tenant organization can configure integration rules for tenant application(s) on server 18 in exactly the same way as if they were developing the integration rules on a digital data processor located within that tenant's data center. Similarly, even if the integration rules were first built within that tenant's data center and then later migrated to server 18, the legacy system information on server 18 coupled with the communication between coordination module 18d and the coordination module located within the tenant's data center (e.g., 12d, 14d) obviate the need to reconfigure the integration rules to maintain the integration links that are defined by such rules.

Figure 3:
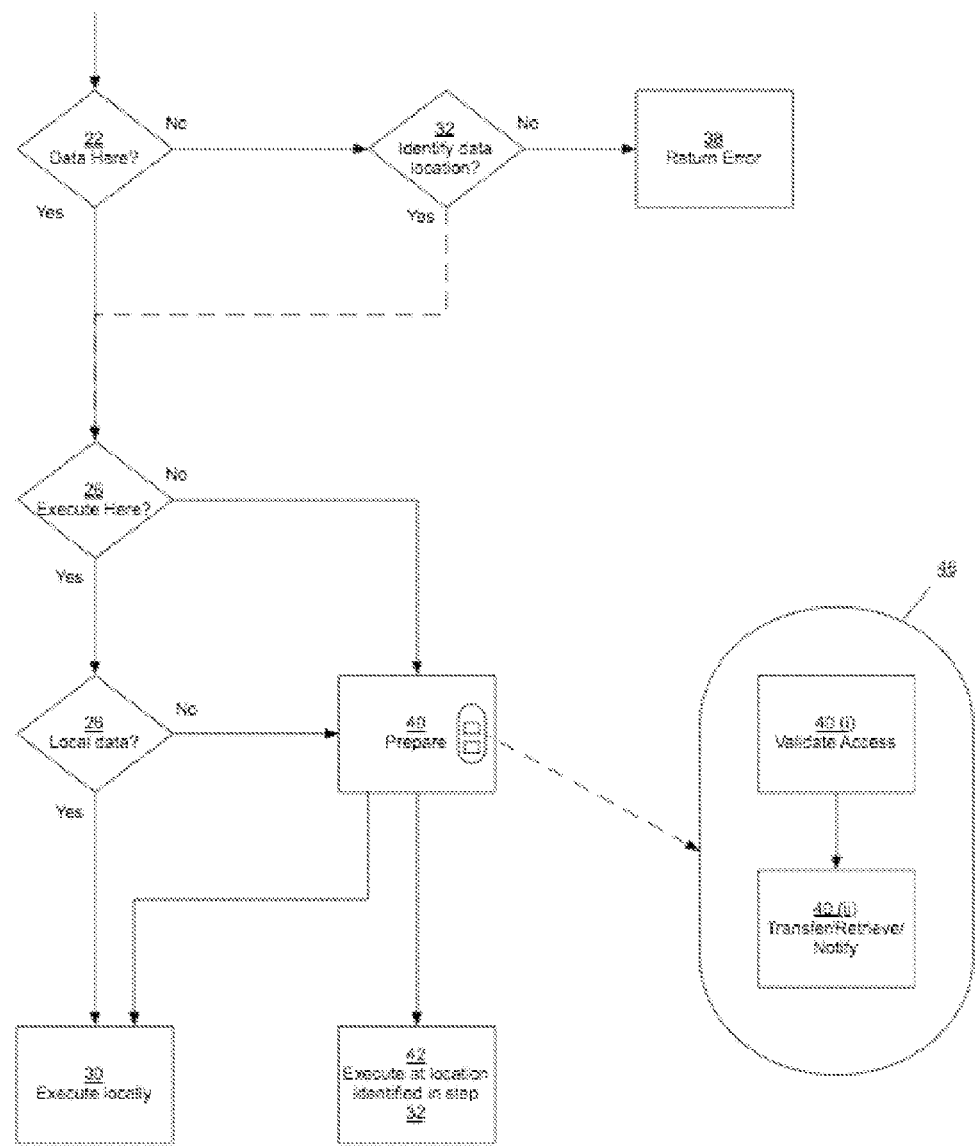
FIG. 3 depicts operation of a coordination module in a system according to the invention within a multi-tenant cloud-based environment.

FIG. 3 illustrates operation of an embodiment of the invention and particularly, for example, operation of module 18d on digital data processor 18 at run-time within a multi-tenant cloud-based environment as described above. In one such embodiment, the module 18d can be configured to omit a few steps and simplify its operation as compared to the illustrated embodiment in FIG. 2. Namely steps 20, 24, 34, 36 and 44 of the operation depicted in FIG. 2 are omitted in here FIG. 3 for various reasons. For example, the platform-as-a-service business model by its very nature typically requires that the service provider (e.g., salesforce.com, Google etc.) provision all required hardware and software components to its tenants. Thus, the coordination module may not need to verify the local presence of all required portions of rules engine 18a in step 24. In fact, all requests by users for rule execution on behalf of the tenants at run-time may initially be signaled to and/or received by engine 18a. After the authentication/verification process (as described above) for the user making the request, the rules engine 18a may also verify the availability of the requested rule before working with module 18d to access the required data in step 22. Therefore, even though rules engine 18a may employ the same techniques as step 20 illustrated in FIG. 2 to verify the local presence of the requested rule, that step 20 can be omitted from the simplified operation of module 18d in the illustrated embodiment.

Once the verification process related to user authentication and local rule presence is completed, coordination module 18d will respond to requests for data access in substantially the same way as described previously in connection with FIG. 2. That is, the module 18d will verify the local presence of the required data on server 18 using the techniques discussed previously. If locally present, the module will typically defer to the local engine 18a for local execution the rule on the required data through steps 26-30. On the other hand, if the required data and/or database are not locally present, the coordination module 18d will attempt to identify the location of the required data in step 32 by checking any of the tenant information, user information, parameters and other indicators of data presence e.g., in the request signaled to the engine 18a and/or the module 18d. In addition or instead, the module 18d may also check integration rules (if any) that may be referenced by or otherwise related to the requested rule and/or the tenant legacy system information that may be found in a registry, data base or elsewhere on the digital data processor 18. Once the appropriate tenant location of the required data is identified in step 32, the coordination module 18*d* may retrieve the data for local execution of the requested rule(s) and/or transfer the requested rule(s) to the identified tenant location for execution, all as previously discussed in connection with steps 26-30 and 40, 42 and 46 depicted FIG. 2.

It will be appreciated that while effecting any of notifications, transfers and retrieval of data and/or rules in step 40 of the illustrated embodiment, the coordination module 18*d* may only open a single port in the tenant firewall. That is a more secure approach than opening multiple ports (e.g., based on integration methods etc.) as required by the conventional approach described above.

It will be appreciated that steps 34, 36 and 44 from the operation depicted in FIG. 2 are also omitted from the illustrated embodiment in FIG. 3 for the sake of simplicity. It is entirely possible, for example, that the identified tenant location (e.g., digital data processor 12) in step 32 may not have the required resources (e.g., computing power and/or rules engine) for the requested rule(s) execution. In that case, the coordination module 18*d* may work with the local coordination module (e.g., 12*d*) at the appropriate tenant data center to identify one or more other digital data processors with the necessary resources within that data center for the execution of the requested rules(s).

Described above are systems and methods meeting the foregoing objects. It will be appreciated that the embodiment illustrated and described herein are merely examples of the invention and other embodiments incorporating changes thereto fall within the scope thereof.

In view thereof, what is claimed is:

1. A distributed rules processing system, comprising
   A. a first digital data processor and a second digital data processor that are coupled to one another by one or more networks,
   B. a rules base and a transactional data base that are each coupled to one of the first and second digital data processors,
   C. the first digital data processor including a rules engine that executes at least one rule from the rules base,
   D. one or more coordination modules associated with a respective one of first and/or second digital data processors that make available to the second digital data processor from the first digital data processor one or more selected rules from the rules base, and
   E. on the second digital data processor, at least one of
      (i) executing one or more of the selected rules as a rules engine or portion thereof,
      (ii) executing one or more of the selected rules using a rules engine executing on the second digital data processor.

2. The distributed rules processing system of claim 1, comprising at least one of a firewall and other functionality that is coupled to the one or more networks and that prevents the second digital data processor from accessing from the first digital data processor, absent intervention of the coordination module(s), said selected rules.

3. The distributed rules processing system of claim 1, wherein the coordination module(s) make the rules available to the second digital data processor from the first digital data processor in response to a request from the rules engine executing on the second digital data processor.

4. The distributed rules processing system of claim 3, wherein the coordination module(s) make the rules available to the second digital data processor from the first digital data processor by opening one or more communications ports on the first digital data processor.

5. The distributed rules processing system of claim 1, wherein the coordination module(s) make the rules available to the second digital data processor from the first digital data processor in response to a request from the first digital data processor.

6. The distributed rules processing system of claim 5, wherein the request is from the rules engine executing on the first digital data processor.

7. A distributed rules processing system, comprising
   A. a first digital data processor and a second digital data processor that are coupled to one another by one or more networks,
   B. a rules base that is coupled to the first digital data processor,
   C. the first digital data processor including a rules engine that executes at least one rule from the rules base,
   D. one or more coordination modules associated with a respective one of first and/or second digital data processors that make available to the second digital data processor from the first digital data processor one or more selected rules from the rules base, and
   E. the second digital data processor at least one of
      (i) executing one or more of the selected rules as a rules engine or portion thereof to process one or more data from a transactional database that is coupled to the second digital data processor,
      (ii) processing with one or more of the selected rules using a rules engine executing on the second digital data processor one or more data from a said transactional database that is coupled to the second digital data processor.

8. The distributed rules processing system of claim 7, comprising at least one of a firewall and other functionality that is coupled to the one or more networks and that prevents the second digital data processor from accessing rules from the rules base on the first digital data processor, absent intervention of the coordination module(s).

9. The distributed rules processing system of claim 7, wherein the coordination module(s) make the rules available to the second digital data processor from the first digital data processor in response to a request from a further rules engine that executes on first digital data processor.

10. The distributed rules processing system of claim 9, wherein the further rules engine generates the request in connection with executing a rule from the rules base.

11. The distributed rules processing system of claim 9, wherein at least one of the coordination module(s) and the further rules engine queries the second digital data processor to determine its availability to execute rules from the rules base.

12. A distributed rules processing system, comprising
   A. a first digital data processor and a second digital data processor that are coupled to one another by one or more networks,
   B. a transactional data base that is coupled to the first digital data processor,
   C. one or more coordination modules associated with a respective one of first and/or second digital data processors that makes available to the second digital data processor from the first digital data processor one or more data from the transactional base, and
   D. a first rules engine executing on the first digital data processor and a second rules engine executing on the second digital data processor, each of the first and second rules engines executing one or more rules from a rules base that is coupled with the first and second digital data processors to process the one or more data from the transactional data base, E. wherein the coordination module(s) make the one or more data from the transactional data base available to the second digital data processor from the first digital data processor in response to a request from the rules engine executing on the second digital data processor.

13. The distributed rules processing system of claim 12, comprising at least one of a firewall and other functionality that is coupled to the one or more networks and that prevents the second digital data processor from accessing data from the transactional data base, absent intervention of the coordination module(s).

14. The distributed rules processing system of claim 12, wherein the coordination module(s) make the one or more data available to the second digital data processor by opening one or more communications ports on the first digital data processor.

15. A method of distributed rules processing, comprising
A. coupling a first digital data processor and a second digital data processor for communications via one or more networks,
B. coupling each of a rules base and a transactional data base to one of the first and second digital data processors,
C. executing on the first digital data processor at least one rule from the rules base as a rules engine,
D. making available, via one or more coordination modules associated with a respective one of first and/or second digital data processors, to the second digital data processor from the first digital data processor one or more selected rules from the rules base, and
E. on the second digital data processor, at least one of
 (i) executing one or more of the selected rules as a rules engine or portion thereof,
 (ii) executing one or more of the selected rules using a rules engine executing on the second digital data processor.

16. The method of claim 15, comprising preventing, with at least one of a firewall and other functionality that is coupled to the one or more networks, the second digital data processor from accessing from the first digital data processor, absent intervention of the coordination module(s), said selected rules.

17. A method of distributed rules processing, comprising
A. coupling a first digital data processor and a second digital data processor for communications via one or more networks,
B. coupling a rules base to the first digital data processor,
C. executing on the first digital data processor at least one rule from the rules base as a rules engine,
D. making available, via one or more coordination modules associated with a respective one of first and/or second digital data processors, to the second digital data processor from the first digital data processor one or more selected rules from the rules base, and
E. on the second digital data processor, at least one of
 (i) executing one or more of the selected rules as a rules engine or portion thereof,
 (ii) executing one or more of the selected rules using a rules engine executing on the second digital data processor, and
 (iii) processing one or more data from a transactional database that is coupled to the second digital data processor using a rules engine executing on the second digital data processor.

18. The method of claim 17, comprising making the one or more selected rules available to the second digital data processor from the first digital data processor in response to a request from a further rules engine that executes on first digital data processor.

19. A method of distributed rules processing, comprising
A. coupling a first digital data processor and a second digital data processor for communications via one or more networks,
B. coupling a transactional data base to the first digital data processor,
C. making available, via one or more coordination modules associated with a respective one of first and/or second digital data processors, to the second digital data processor from the first digital data processor one or more data from the data base,
D. executing with a first rules engine on the first digital data processor and a second rules engine on the second digital data processor one or more selected rules on the one or more data made available from the transactional data base, and
E. wherein the coordination module(s) make the one or more data from the data base available to the second digital data processor from the first digital data processor in response to a request from the rules engine executing on the second digital data processor.

* * * * *